(12) United States Patent
McGlone et al.

(10) Patent No.: US 9,563,591 B2
(45) Date of Patent: Feb. 7, 2017

(54) PERIPHERAL COMPONENT INTERCONNECT EXPRESS (PCIE) PING IN A SWITCH-BASED ENVIRONMENT

(71) Applicant: International Business Machines Corporation, Armonk, NY (US)

(72) Inventors: Elizabeth A. McGlone, Rochester, MN (US); Brian T. Vanderpool, Byron, MN (US); Jeffrey B. Williams, Raleigh, NC (US); Curtis C. Wollbrink, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 319 days.

(21) Appl. No.: 14/198,911

(22) Filed: Mar. 6, 2014

(65) Prior Publication Data

US 2015/0254200 A1    Sep. 10, 2015

(51) Int. Cl.
 *G06F 13/20*    (2006.01)
 *G06F 13/00*    (2006.01)
 *G06F 13/40*    (2006.01)

(52) U.S. Cl.
 CPC ... *G06F 13/4022* (2013.01); *G06F 2213/0026* (2013.01)

(58) Field of Classification Search
 CPC ...... H04L 43/50; H04L 65/1069; H04L 41/12; G06F 11/3664; G06F 11/3668; G06F 11/0751; G06F 13/4022; G06F 2213/0026; G06F 11/273
 USPC ................................................. 710/313, 316
 See application file for complete search history.

(56) References Cited

U.S. PATENT DOCUMENTS

| | | | | |
|---|---|---|---|---|
| 4,837,764 A * | 6/1989 | Russello | ............. | G06F 11/2221 714/44 |
| 7,058,738 B2 * | 6/2006 | Stufflebeam, Jr. | .. | G06F 13/4022 370/389 |
| 7,536,473 B2 | 5/2009 | Ajanovic et al. | | |
| 7,676,617 B2 | 3/2010 | Kloeppner | | |
| 7,739,432 B1 * | 6/2010 | Shaw | .................. | G06F 13/4022 360/44 |
| 7,916,717 B2 * | 3/2011 | Morris | .................. | H04M 3/567 370/354 |
| 7,975,190 B2 * | 7/2011 | Smith | ................. | H04L 12/2697 709/220 |
| 7,983,888 B2 | 7/2011 | Evoy et al. | | |
| 8,149,730 B1 | 4/2012 | Aybay et al. | | |
| 8,285,907 B2 | 10/2012 | Chappell et al. | | |
| 8,467,319 B1 * | 6/2013 | Jones | .................. | H04L 12/1827 370/260 |
| 2003/0185210 A1 * | 10/2003 | McCormack | ....... | H04L 12/2697 370/392 |

(Continued)

*Primary Examiner* — Faisal M Zaman
(74) *Attorney, Agent, or Firm* — Patterson + Sheridan, LLP

(57) ABSTRACT

A sideband PCI Express (PCIe) packet initiator in a distributed PCIe switch fabric verifies a PCIe connection between a host device and a PCIe endpoint device without having to power on the host device. The packet initiator assembles a PCIe test packet that acts as a ping for testing reachability of the endpoint device, from the perspective of the host device. The test packet may also verify configurations and settings of the path to the endpoint device. The distributed switch fabric is configured to compare completion data with expected results to verify the PCIe connection, without having to boot the host device.

14 Claims, 3 Drawing Sheets

(56) References Cited

U.S. PATENT DOCUMENTS

| | | | |
|---|---|---|---|
| 2005/0270974 A1* | 12/2005 | Mayhew | H04L 45/34 370/229 |
| 2006/0242353 A1* | 10/2006 | Torudbakken | G06F 13/4022 710/316 |
| 2007/0010962 A1* | 1/2007 | Shih | G06F 11/2733 702/122 |
| 2007/0036082 A1* | 2/2007 | Sonksen | G06F 11/221 370/242 |
| 2007/0226532 A1* | 9/2007 | Matsuda | G06F 11/0709 714/4.1 |
| 2009/0046720 A1* | 2/2009 | Streijl | H04L 43/18 370/394 |
| 2009/0164694 A1* | 6/2009 | Talayco | G06F 13/4022 710/316 |
| 2009/0296588 A1* | 12/2009 | Nishi | H04L 12/2697 370/242 |
| 2011/0131361 A1* | 6/2011 | Itakura | G06F 11/2033 710/313 |
| 2013/0111258 A1 | 5/2013 | Chencinski et al. | |
| 2014/0169183 A1* | 6/2014 | Allan | H04L 41/12 370/248 |
| 2015/0067418 A1* | 3/2015 | Lee | G06F 11/263 714/720 |
| 2015/0095712 A1* | 4/2015 | Han | G11C 29/1201 714/42 |
| 2015/0138993 A1* | 5/2015 | Forster | H04L 41/12 370/248 |

* cited by examiner

PERIPHERAL COMPONENT INTERCONNECT EXPRESS (PCIE) PING IN A SWITCH-BASED ENVIRONMENT

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the present disclosure provide a computer-implemented method for verifying connections of a distributed switch comprising a plurality of switch modules. Each switch module of the plurality may have at least one port for establishing connections according to a predefined interface. The method includes receiving an indication to verify a connection from a host device to an endpoint device. The host device is connected to an upstream port of a first switch module of the plurality of switch modules, and the endpoint device is connected to a downstream port of the distributed switch. The method further includes transmitting a test packet from the upstream port of the first switch module to the downstream port of the distributed switch without powering on the host device, and receiving a response packet from the downstream port, wherein the response packet comprises completion data resulting from processing the test packet. The method includes, responsive to determining the completion data matches an expected value associated with the test packet, determining the connection has been established between the host device connected to the upstream port and the endpoint device connected to the downstream port of the distributed switch.

Embodiments of the present disclosure further provide a computer program product and a system for performing an operation for verifying connections of a distributed switch comprising a plurality of switch modules. Each switch module of the plurality may have at least one port for establishing connections according to a predefined interface. The operation includes receiving an indication to verify a connection from a host device to an endpoint device. The host device is connected to an upstream port of a first switch module of the plurality of switch modules, and the endpoint device is connected to a downstream port of the distributed switch. The operation further includes transmitting a test packet from the upstream port of the first switch module to the downstream port of the distributed switch without powering on the host device, and receiving a response packet from the downstream port, wherein the response packet comprises completion data resulting from processing the test packet. The operation includes, responsive to determining the completion data matches an expected value associated with the test packet, determining the connection has been established between the host device connected to the upstream port and the endpoint device connected to the downstream port of the distributed switch.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

Figure 1:
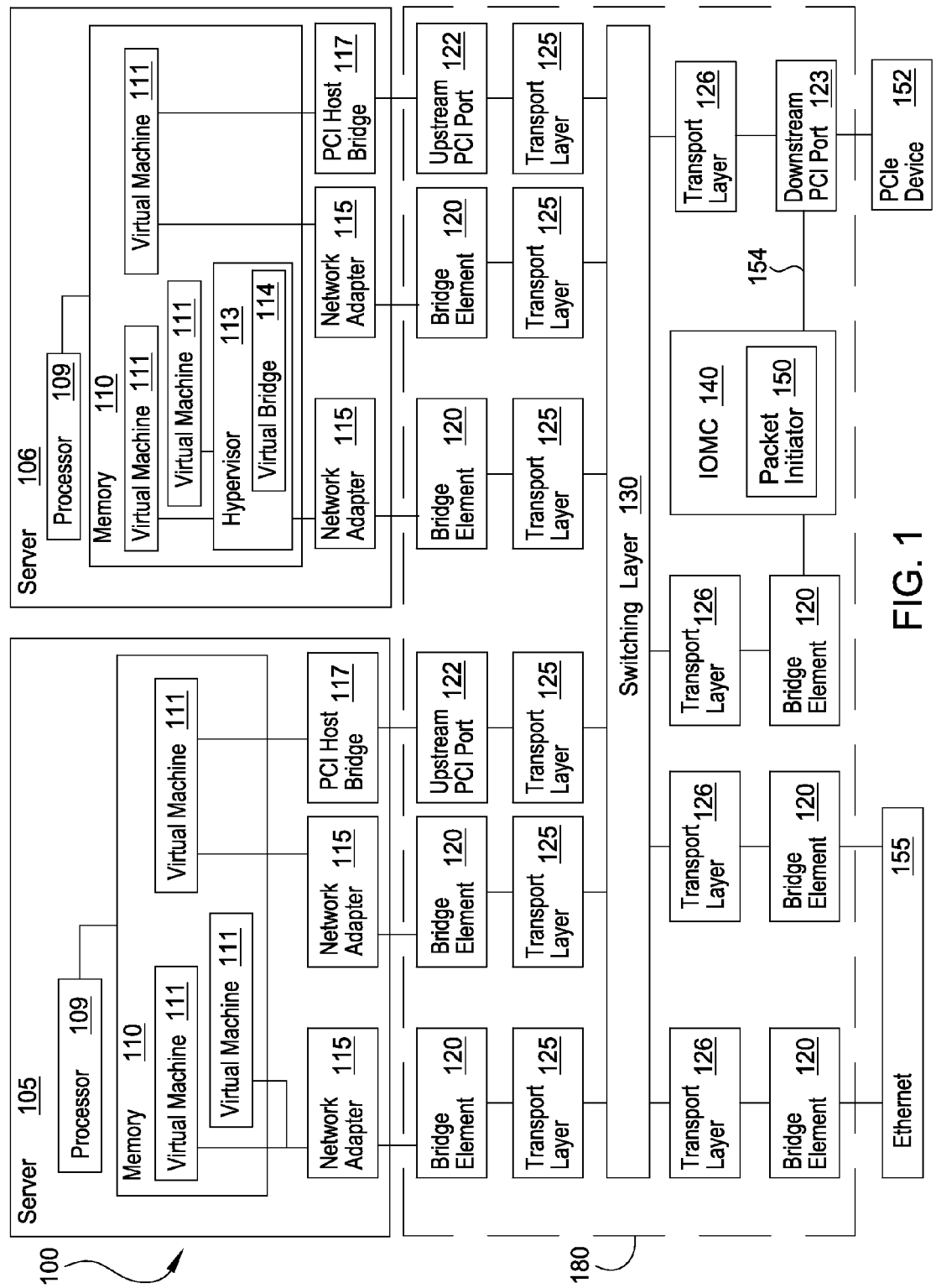
FIG. 1 illustrates a computing system that includes a distributed network switch, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present disclosure provide a method and a system that allows verification of Peripheral Component Interconnect Express (PCIe) paths in a switch-based environment, including a distributed switch fabric having a plurality of switch modules. Embodiments of the present disclosure use sideband signaling to generate a test packet to verify the complete PCIe path and configuration between a host device and an endpoint device, prior to powering on the host device. A management controller or service processor accesses a packet initiator inside the distributed network switch and assembles the test packet with an appropriate destination identifier to reach the (downstream) endpoint device from an upstream port of the PCIe switch fabric. When the downstream port returns completion data, the completion data is compared to expected results, thereby allowing the management controller to determine if the link path and integrity are correct. If the downstream port does not return data (or times out), the management controller may take appropriate action to rectify the condition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In the following, reference is made to embodiments of the present disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Referring now to FIG. 1, FIG. 1 illustrates a system architecture of a computing system 100 that includes a distributed network switch 180, according to one embodiment of the present disclosure. The computing system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

In one embodiment, the IOMC 140 may include a packet initiator 150, which is logic configured to programmatically generate a PCIe packet to verify the PCIe path and configuration between a host device, such as servers 105, 106, and an endpoint device, such as PCIe device 152, prior to powering on the host device. In the embodiment shown, the packet initiator 150 may insert the generated PCIe packet to be forwarded within the distributed network switch 180 through a link 154 to one or more PCIe ports. In some implementations, the link 154 represents any one of a sideband memory-mapped I/O (MMIO), Inter-Integrated Circuit ($I^2C$) bus, or JTAG communication mechanisms, which the IOMC 140 may use to access PCIe ports and an associated PCIe bus of the distributed network switch 180.

Figure 2:
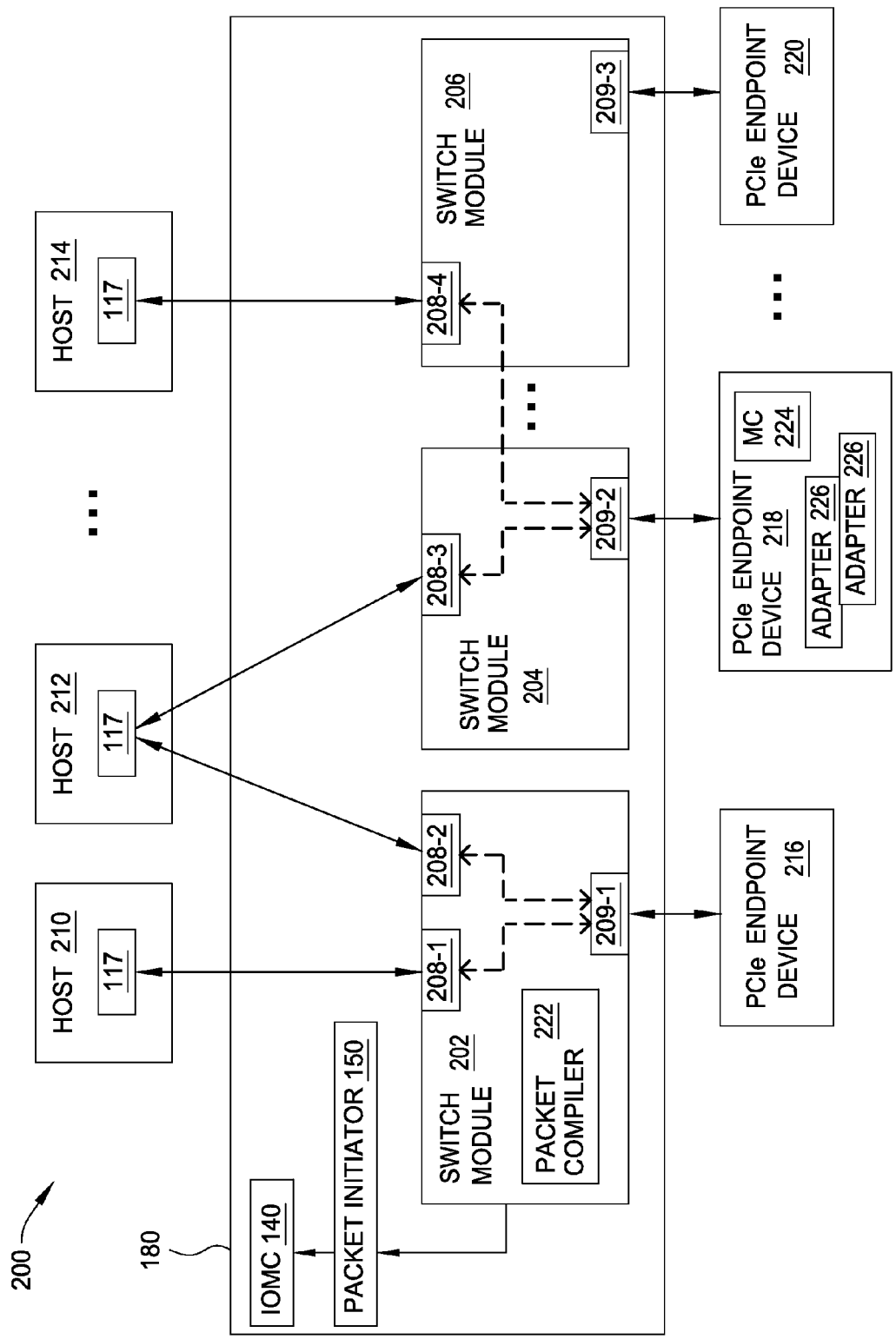
FIG. 2 illustrates a hardware representation of a system that implements a distributed network switch, according to one embodiment of the present disclosure.

FIG. 2 illustrates a hardware representation of a system 200 that implements the distributed network switch 180, according to one embodiment of the present disclosure. As shown, the system 200 includes a distributed network switch 180 having a plurality of switch modules 202, 204, 206 and one or more IOMCs 140. The distributed network switch 180 is configured to act as a PCIe switch fabric that enables servers 210, 212, 214 connected at ports 208 of the distributed network switch to access PCIe devices 216, 218, 220 connected at ports 209 of the distributed network switch. The ports 208 may be configured similarly to the ports 122 of FIG. 1, and may be characterized as "upstream" ports (i.e., host-side) that connect to one of servers 210, 212, 214. The ports 209 may be configured similarly to the ports 123 of FIG. 1 and be characterized as "downstream" ports (i.e., adapter-side) that connect to one or more devices (e.g., PCIe devices 152) that expand the connectivity or capabilities of the system 200.

In the embodiment shown, one or more PCIe endpoint devices 216, 218, 220 are connected to the downstream ports 209-1, 209-2, 209-3, respectively, and may provide I/O capabilities and/or additional storage or memory which each server 210, 212, 214 may access via the switch modules. In one example, the PCIe endpoint device 218 is a PCIe expansion unit controlled by a management controller 224 and includes a plurality of PCIe adapters 226. Each PCIe endpoint device 216, 218, 220 may have a set of memory registers referred to as a "Configuration Space," which may be accessed by components of the distributed network switch 180, as well as device drivers, diagnostic software, and operating systems of the system 200, to enable automatic configuration of the PCIe endpoints.

In one embodiment, the switch modules 202, 204, 206, also referred to as a chassis interconnect elements (CIE), are hardware components (e.g., PCB boards, FPGA boards, system on a chip, etc.) that provide physical support and connectivity between the network adapters of the servers 210, 212, 214 and the bridge elements contained within the switch modules 202, 204, 206, as well as connectivity between PCI host bridges 117 of the servers 210, 212, and 214, and the PCIe ports of the switch modules 202, 204, and 206. The switch modules 202, 204, 206 may be interconnected by a switching layer 130, described above. In one embodiment, the switch modules 202, 204, 206 may include a logical or physical grouping of the bridge elements 120 shown in FIG. 1. In some embodiments, a switch module may route data sent using either Ethernet or PCI communication protocols to other switch modules within the distributed network switch 180.

In one or more embodiments, each switch module may include at least one upstream port 208 providing a link (shown as the solid arrows) to the hosts 210, 212, 214 and at least one downstream port 209 providing a link (shown as the solid arrows) to the PCIe endpoint devices 216, 218, 220. Each upstream port 208 and downstream port 209 of a respective switch module may be connected, as indicated by the dashed arrows, and are used to route data and traffic between devices connected to the switch modules. Furthermore, an upstream port 208 of one switch module may be connected to a downstream port 209 of another switch module, thereby forming a distributed switch fabric. For example, the dashed arrow indicates a connection between the upstream port 208-4 of switch module 206 to the downstream port 209-2 of switch module 204. Although each switch module is shown as including at least one upstream port and at least one downstream port, in other embodiments, a switch module may include one or more upstream ports, and no downstream ports. In still other embodiments, a switch module may include one or more downstream ports, and no upstream ports. In some embodiments, each of the ports 208, 209 may be assigned a unique identifier, e.g., port "1", port "2", etc, that identifies the port within the distributed network switch 180.

The ports 208, 209 may be connected to each other in various different configurations, as well as different settings (e.g., speed, bandwidth, direction, etc.) for routing PCIe traffic between the hosts and the PCIe endpoint devices. However, the use of multiple, distributed components to form different connections and combinations of ports within the PCIe switch fabric can increase the possibility of failure, errors, or mis-configurations. In conventional systems where a PCIe-host-attached system or device is attached to a switch, the only known method for verifying a proper path setup to the device is to boot the system or device. In PCIe terms, the convention technique for verifying a connection from a root port (e.g., host 210) to an endpoint device (e.g., PCIe endpoint device 216) is to boot the root port. However, if paths within the PCIe switch fabric are not set up properly, switch errors and/or endpoint errors require the host to be rebooted to try and recover. For example, if there is a physical problem with one of many links downstream of the host device, or if PCIe paths have not been configured correctly, initial PCIe packets may never reach the endpoint. As such, this scenario often results in a continuous reboots of the host, or in other case, a CPU being disabled due to processor internal errors (i.e., IERRs).

According to one or more embodiments, the distributed network switch includes a side-band PCIe packet initiator 150, which is not directly connected to the physical interface of a host device, which is configured to verify the complete PCIe path and configuration prior to powering on the host device. This module is referred to as a "side-band" packet initiator since the communications from the packet initiator are not part of the PCIe specification, but have been added in accordance with an aspect of the present disclosure. In one embodiment, the packet initiator 150 is logic executed by a service processor or a management controller, e.g., IOMC 140, configured to manage and configure the different hardware resources in the system 200. While FIG. 2 depicts a single IOMC 140 within the distributed network switch 180, it should be recognized that each switch module may include a respective IOMC responsible for managing one or more corresponding switch modules.

In one embodiment, the packet initiator 150 is configured to communicate with a PCIe packet compiler 222 within the PCIe switch fabric, e.g., within at least one of the switch modules 202, 204, 206). The PCIe packet compiler 222 may be part of a logical protocol processing unit configured to processing data flows according to the PCIe protocol. While a single PCIe packet compiler 222 is shown in FIG. 2, in some embodiments, each port 208, 209 in a switch module may have a corresponding logical protocol processing unit for processing traffic on that port, or may share one or more processing units among ports in the same switch module. In such embodiments, the IOMC 140 may communicate with each PCIe packet compiler associated with each port or associated with each switch module.

In operation, to verify a connection to a particular endpoint device, the packet initiator 150 may program the PCIe packet compiler 222 to generate a PCIe "ping" packet to that endpoint device, and instruct the packet compiler 222 to transmit the generated packet through the PCIe switch fabric. For example, prior to powering on the host 210, the PCIe packet initiator 150 may instruct the packet compiler 222 to generate and transmit a PCIe ping packet to the PCIe endpoint device 216. If a PCIe response packet returns from the targeted endpoint device, the IOMC 140 may read out the status of the response packet to verify that the endpoint device is connected to the host device, and in some embodiments, has a connection to the host device with an optimal or preferred configuration. It should be recognized that the PCIe ping packet may travel through one or more peer switch modules within the PCIe switch fabric to reach (and return from) the targeted endpoint device. For example, to verify a connection from the host 214 and the PCIe device 218, the packet initiator 150 generates and transmits a PCIe ping packet from the upstream port 208-4 of the switch module 206 connecting the host 214. The PCIe ping packet in this example travels between switch module 204, 206, as part of inter-switch communication, and to the downstream port 209-2 connecting the endpoint device 218.

Figure 3:
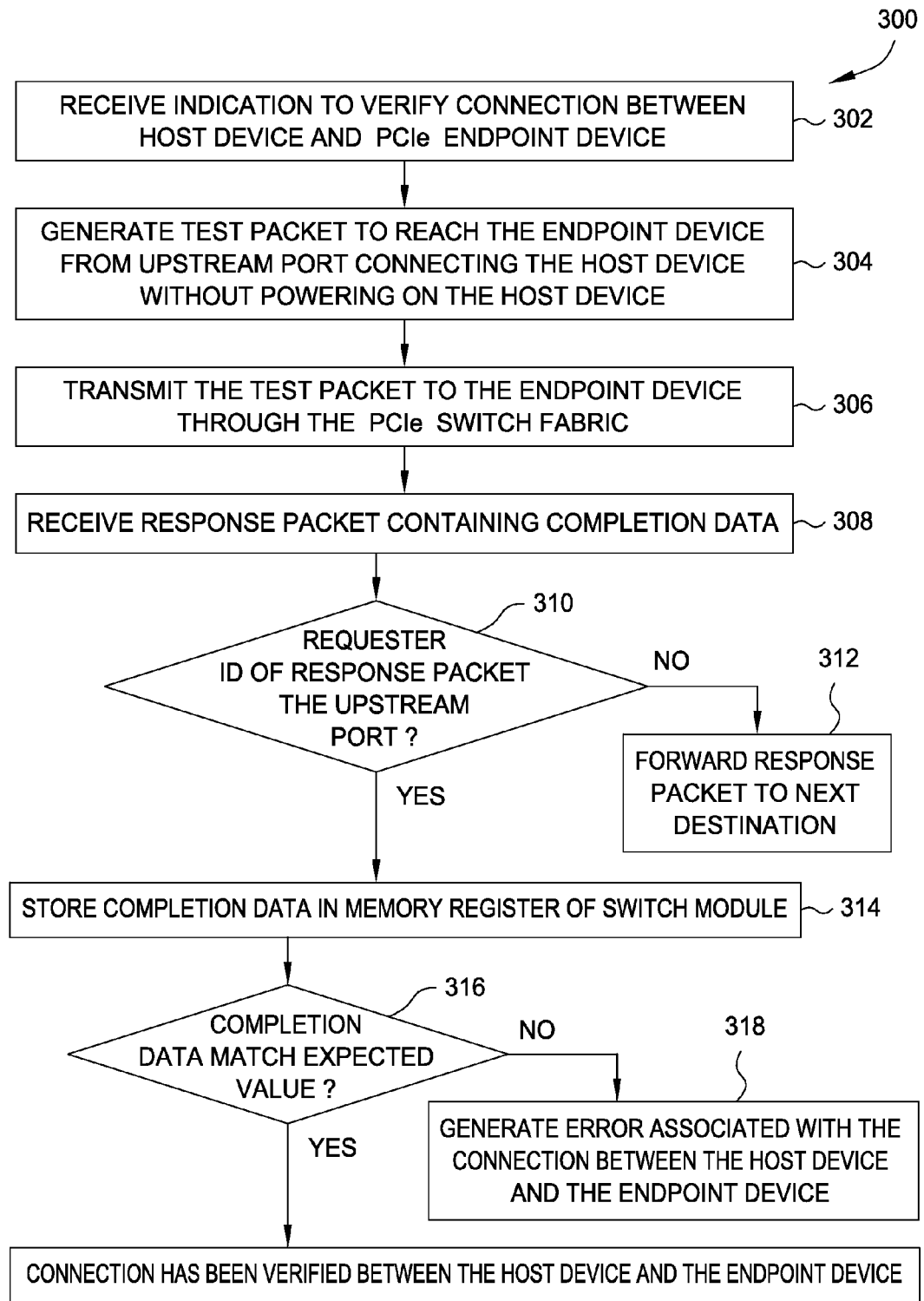
FIG. 3 is a flow diagram depicting a method for managing a distributed network switch having a plurality of ports, according to one embodiment of the present disclosure.

FIG. 3 is a flow diagram depicting a method 300 for verifying PCIe connections of switch modules of a distributed network switch, according to one embodiment of the present disclosure. As shown, the method 300 begins at block 302, the IOMC 140 receives an indication to verify the connection between a host device and a PCIe endpoint device. In some embodiments, the indication to verify the PCIe connection may be automatically generated in response to detecting a new host device or PCIe endpoint device has been physically connected to a port of the distributed network switch. In other embodiments, the indication to verify the PCIe connection may be generated responsive to explicit user input (e.g., from a system administrator) to perform the verification process.

In one embodiment, the indication to verify the PCIe connection may be generated as part of a setup procedure for the hosts, the endpoint devices, and/or the distributed network switch 180 itself. For example, in the case of a large PCIe switch fabric, there may be hundreds of PCIe devices (e.g., PCIe expansion cards) plugged into the distributed network switch 180, but not all of the devices will be connected to a particular root port. As part of the configuration for the distributed network switch 180, the IOMC 140 can assign one or more PCIe devices attached to the distributed network switch and make the PCIe devices available to a root port (i.e., host 210). Prior to powering on the root port (i.e., host), a user may specify which of the many endpoint devices will be accessible by that root port, or conversely, how many root ports can share a same PCIe endpoint device, as part of the configuration process. As such, the IOMC 140 may receive an indication to verify a connection between a root port (i.e., host) and a plurality of endpoint devices that were specified in the configuration process as those devices to be connected for that particular root port. As such, while FIG. 3 describes a method for verifying a connection between a host device and a single endpoint device, it should be recognized that the operations of method 300 may be repeated for paths to each of the plurality of endpoint devices to be verified.

At block 304, the packet initiator 150 (e.g., by operation of the IOMC 140) generates a test packet to reach the endpoint device from an upstream port connecting the host device without powering on the host device. In one embodiment, the packet initiator 150 programmatically requests a PCIe packet compiler 222 of the switch module connected to the host 210 to generate a PCIe test packet. The PCIe test packet acts as a "ping" that tests the reachability of a PCIe endpoint device connected to the distributed network switch 180.

In one or more embodiments, the PCIe test packet may be generated based on parameters that the packet initiator 150 passes to the PCIe packet compiler 222. The provided parameters may include a source identifier, a destination identifier associated with the PCIe endpoint device, a type of PCIe transaction (e.g., memory read/write, I/O, configuration, message) that the PCIe test packet is to contain, and one or more values expected to be received in response to the PCIe test packet, referred to hereafter as expected values associated with the PCIe test packet. The IOMC 140 may determine the source and destination identifiers used to generate the test packet using the IOMC's knowledge of the internal topology of the distributed network switch, which the IOMC maintains as part of its duties to manage the various components of the distributed network switch 180.

In one embodiment, the packet initiator 150 determines a destination identifier associated with the PCIe endpoint device such that the test packet is routed through the distributed network switch 180 and reaches reach the desired PCIe endpoint device using mechanisms for address routing, ID routing, and implicit routing, as specified by the PCIe protocol. The packet initiator 150 determines a source identifier associated with a primary side of the distributed network switch logically associated with the port causing the request generation. In some embodiments, because the test packet is generated for the switch module's own behalf, the source identifier used is associated with the switch module 202 associated with the upstream port 208 connected to the host device, rather than being associated with the host device itself. For example, the source identifier may be associated with the upstream port 208-1 of the switch module 202 connected to the host 210. In this way, from the PCIe packets the switch module receives, the switch module 202 can distinguish between normal PCIe packets destined for the host device (which may be powered off initially) and PCIe packets returned in response to the test packet. The source identifier may be used by the switch module to capture data from PCIe packets responding to the test packet, for use by the IOMC 140. In one embodiment, the source identifier may be set to a pre-determined value that signals to the switch module to capture returned data and store the data in internal debug registers, as described later.

In one embodiment, the packet compiler 222 generates a PCIe packet having a data field, referred to as a requester ID, using the source identifier provided by the packet initiator 150, and another data field, referred to as a completer ID, using the destination identifier also provided by the packet initiator. As a result, the packet compiler 222 generates a PCIe packet having a requester ID associated with the upstream port 208-1 having a link with the host device and a completer ID associated with the PCIe endpoint device. In one embodiment, the packet compiler 222 may store the expected values associated with the PCIe test packet that were provided by the packet initiator 150 in one or more internal registers of the switch module.

The generated PCIe packet, referred to in PCIe terms as a "Request", further contains the transaction-related parameters provided by the packet initiator. In one embodiment, the transaction provided by the packet initiator is selected such that the type of PCIe transaction requires, according to the PCIe protocol, a response packet to be returned, referred to in PCIe terms as a "Completion." These types of PCIe transactions are referred to as Non-Posted operations, and may include PCIe Memory Reads, I/O Reads, and Configuration Reads and Writes, although other types of transactions may be used as well.

In one example, the packet initiator 150 may assemble a PCIe test packet by specifying (to the packet compiler 222) a configuration transaction used to access one or more configuration registers of the PCIe endpoint device, destination bus/device/function identifiers that specify the destination PCIe endpoint device, and source bus/device/function identifiers associated with the upstream port 208 connecting the host device. In another example, the packet initiator 150 may assemble a PCIe test packet by specifying (to the packet compiler 222) a memory or I/O transaction used to transfer some data to and from a memory-mapped or I/O mapped location of the PCIe endpoint device, a destination address that specifies the destination PCIe endpoint device, and a source address associated with the upstream port 208 of the host device.

In an alternative embodiment, rather than generate the packet natively within the switch fabric using a packet compiler 222, the packet initiator 150 may generate and insert a fully-formed PCIe test packet into the PCIe switch fabric to be forwarded. As such, in this embodiment, the packet initiator 150 (e.g., by operation of the IOMC) generates a PCIe test packet having a requester identifier associated with the upstream port connected to the host device, a completer identifier associated with the downstream port connected to the PCIe endpoint device, and a transaction, similar to the embodiments described above.

At block 306, the switch module 202 transmits the test packet to the PCIe endpoint device through the PCIe switch fabric, according to known techniques for routing PCIe traffic through a distributed network switch. The PCIe endpoint device may receive the test packet, process the transaction contained within, and transmit a response packet, referred to in PCIe terms as a "Completion", based on the results of processing the transaction. For example, if the test packet specified a memory or I/O read transaction, the PCIe endpoint device may transmit a response packet containing payload data retrieved from the requested memory or I/O location. In another example, if the test packet specified a configuration transaction, the PCIe endpoint device may transmit a response packet containing a completion status, and optionally, payload data retrieved from the requested configuration register of the endpoint device. The response packet may have completer ID and requester ID values which are taken from the test packet, such that the response packet can be routed back to the switch module 202.

At block 308, the switch module 202 receives a response packet containing completion data. The completion data refers to one or more data values contained in the response packet, including payload data of the Completion (from a Read transaction), the completer ID, the requester ID, a completion status (e.g., "Successful Completion", "Unsupported Request", "Configuration Request Retry Status", "Completer Abort"), and other data fields in the response packet.

At block 310, the switch module 202 determines whether the requester identifier of the response packet is associated with the upstream port of the switch module 202. If not, at block 312, the switch module 202 may forward the response packet to a next destination within the PCIe switch fabric. If so, at block 314, the switch module 202 stores the completion data of the response packet in a memory register of the switch module 202. In one implementation, the completion data may be written to an internal register block, which is a portion of the switch module's memory register allocated for debugging, configuration, and error reporting.

At block 316, the switch module 202 determines whether the stored completion data matches an expected value associated with the test packet. The expected values may be provided by the IOMC 140 as one of the parameters provided to the PCIe packet compiler, as described earlier. For example, the expected values may specify the completer ID associated with the target PCIe endpoint device, as well as a Completion Status value indicating a Successful Completion (i.e., field values "000b" or "SC"). In one embodiment, the completion data may be compared against expected values that specify a Completion data payload for specific values in the configuration space of the PCIe endpoint device. For example, the expected values may be a specific identifier value associated with the PCIe endpoint device, including a vendor ID, a device ID, a subsystem vendor ID, and a subsystem ID. In some embodiments, the completion data may be compared against expected values of the configuration space to determine whether the path to the PCIe endpoint device has been configured with a particular, preferred configuration (e.g., error reporting enabled, power modes, memory limits, etc.). In one example, the expected values may be a specific value of the Status register of the PCIe endpoint device, which may be used to report which features of the PCIe protocol are supported by the endpoint device, or the Command register of the PCIe endpoint device, which contains a bitmask of features that have been individually enabled and disabled.

In some embodiments, the switch module 202 may use a mask value that selects portion(s) of the completion data when comparing the stored completion data to the expected values. The mask value may specify which fields of the completion data (e.g., Completer ID, Completion Status), and/or which portions of which fields of the completion data (e.g., just the portion of Configuration Completion data payload that corresponds to a device ID). The mask value provides the flexibility to check for particular configurations of the PCIe endpoint devices, or to simply check for a successful returned Completion. The mask value may be part of the plurality of parameters provided by the packet initiator 150 when generating the test packet.

At block 320, responsive to determining the stored completion data matches the expected value associated with the test packet, the switch module 202 may determine that a connection has been verified between the host device and the endpoint device. The switch module 202 may transmit an indication to the IOMC 140, for example, through signal, interrupt, or memory-mapped I/O, thereby providing the verification of the connection to higher levels of software, such as a management utility.

Otherwise, at block 318, the switch module 202 may generate an error associated with the connection between the host device and the endpoint device. In some embodiments, if no completion data has been returned at all (e.g., in blocks 308, 310) within a threshold period of time, the switch module 202 may generate a timeout error, referred to as a Completion Timeout, associated with the connection between the host device and the endpoint device. In some embodiments, responsive to determining the stored completion data does not match the expected value, the IOMC 140 may perform one or more remedial actions to correct the error, such as resetting the downstream port 209 having a link to the endpoint device, or re-configuring one or more settings of one or more ports in the distributed network switch. In other embodiments, the IOMC 140 may generate a notification that alerts a user to physically re-connect the PCIe endpoint device, i.e., re-seat a PCIe adapter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer program product for verifying connections of a distributed switch comprising a plurality of switch modules, the computer program product comprising:
   a computer-readable storage medium having computer-readable program code embodied therewith, the computer-readable program code comprising:
      computer-readable program code, executable by a processor, configured to receive an indication to verify a connection from a host device to an endpoint device, wherein the host device is connected to an upstream port of a first switch module of the plurality of switch modules, and the endpoint device is connected to a downstream port of the distributed switch;
      computer-readable program code configured to transmit a test packet from the upstream port of the first switch module to the downstream port of the distributed switch without powering on the host device, wherein transmitting the test packet comprises generating the test packet which includes a first data field identifying the upstream port of the first switch module as a source and a second data field identifying the endpoint device as a destination;
      computer-readable program code configured to receive a response packet from the downstream port, wherein the response packet comprises completion data resulting from processing the test packet; and
      computer-readable program code configured to, responsive to determining the completion data matches one or more values expected to be received in response to the test packet, determine the connection has been established between the host device connected to the upstream port and the endpoint device connected to the downstream port of the distributed switch.

2. The computer program product of claim 1, wherein the first data field is a requester identifier associated with the upstream port and the second data field is a completer identifier associated with the endpoint device.

3. The computer program product of claim 1, wherein the test packet is generated by a packet initiator module not directly connected to a physical interface of the host device.

4. The computer program product of claim 1, further comprising:
   computer-readable program code configured to, responsive to determining the completion data does not match the one or more expected values, generate an error associated with the connection between the host device and the endpoint device.

5. The computer program product of claim 1, further comprising:
   computer-readable program code configured to, responsive to determining the response packet comprises a requester identifier associated with the upstream port, store the completion data of the response packet in a memory register of the first switch module.

6. The computer program product of claim 1, wherein the computer-readable program code configured to determine the completion data matches the one or more expected values further comprises:
   computer-readable program code configured to modify the completion data based on a mask value associated with the test packet; and
   computer-readable program code configured to compare the modified completion data with the one or more expected values.

7. The computer program product of claim 1, wherein the upstream port and the downstream port of the distributed switch are configured to establish the connections according to a predefined interface, wherein the predefined interface is a Peripheral Component Interconnect Express (PCIe) interface, and wherein the test packet includes a PCIe configuration transaction for the endpoint device.

8. An apparatus comprising:
   a plurality of switch modules having a plurality of ports, each switch module having at least one port for establishing connections according to a predefined interface;
   a computer processor; and
   a memory storing management firmware, which, when executed on the computer processor, performs an operation comprising:
      receiving an indication to verify a connection from a host device to an endpoint device, wherein the host device is connected to an upstream port of a first switch module of the plurality of switch modules, and the endpoint device is connected to a downstream port of the apparatus,
      transmitting a test packet from the upstream port of the first switch module to the downstream port without powering on the host device, wherein the transmitting the test packet comprises generating the test packet which includes a first data field identifying the upstream port of the first switch module as a source and a second data field identifying the endpoint device as a destination,
      receiving a response packet from the downstream port, wherein the response packet comprises completion data resulting from processing the test packet, and
      responsive to determining the completion data matches one or more values expected to be received in response the test packet, determining the connection has been established between the host device connected to the upstream port and the endpoint device connected to the downstream port.

9. The apparatus of claim 8, wherein the first data field is a requester identifier associated with the upstream port and the second data field is a completer identifier associated with the endpoint device.

10. The apparatus of claim 8, wherein the test packet is generated by a packet initiator module not directly connected to a physical interface of the host device.

11. The apparatus of claim 8, wherein the operation further comprises:
   responsive to determining the completion data does not match the one or more expected values, generating an error associated with the connection between the host device and the endpoint device.

12. The apparatus of claim 8, wherein the operation further comprises:
   responsive to determining the response packet comprises a requester identifier associated with the upstream port, storing the completion data of the response packet in a memory register of the first switch module.

13. The apparatus of claim 8, wherein determining the completion data matches the one or more expected values further comprises:
   modifying the completion data based on a mask value associated with the test packet; and
   comparing the modified completion data with the one or more expected values.

14. The apparatus of claim 8, wherein the predefined interface is a Peripheral Component Interconnect Express (PCIe) interface, and wherein the test packet includes a PCIe configuration transaction for the endpoint device.

* * * * *